Dec. 4, 1962  W. H. CLINGMAN, JR  3,067,115
CHEMICAL CONVERSIONS AND REACTIONS
Filed Jan. 9, 1959
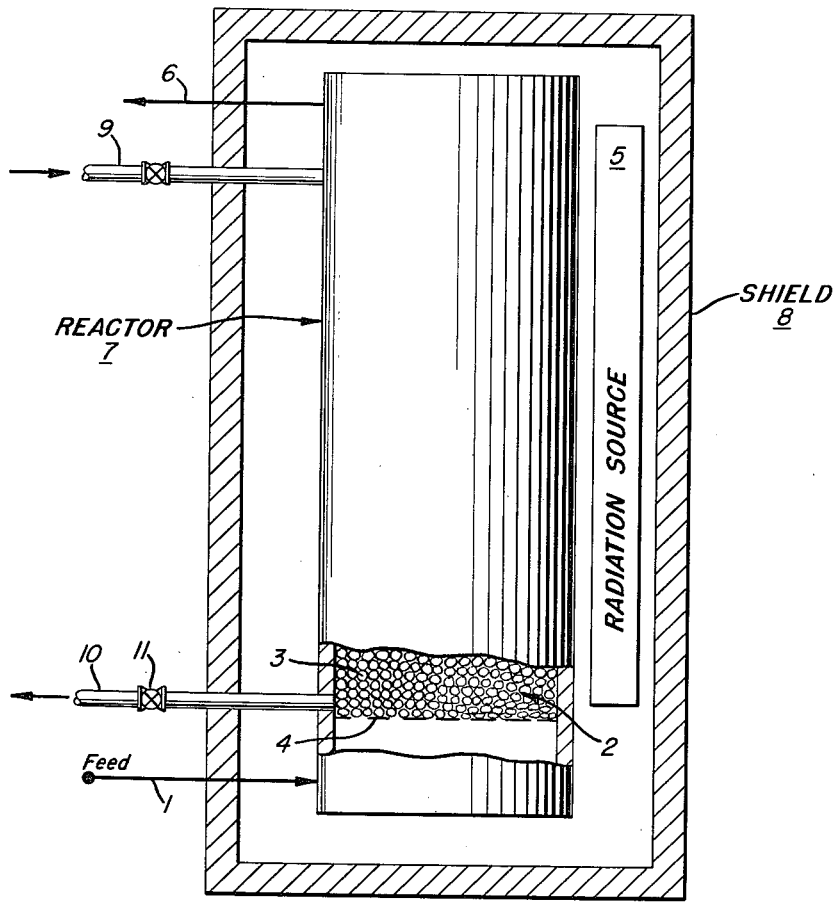
INVENTOR.
William H. Clingman Jr.
BY
ATTORNEY 3,067,115
CHEMICAL CONVERSIONS AND REACTIONS
William H. Clingman, Jr., Texas City, Tex., assignor, by mesne assignments, to Standard Oil Company, Chicago, Ill., a corporation of Indiana
Filed Jan. 9, 1959, Ser. No. 785,911
15 Claims. (Cl. 204—154)

This invention relates to increasing efficiency of reactions induced by ionizing radiation, for example, organic chemical reactions such as hydrocarbon reactions induced by gamma radiation. In its more particular aspects, this invention relates to the oxidation of hydrocarbons in the presence of ionizing radiation.

As a result of the greater availability of sources of high energy ionizing radiation created by concentrated efforts in recent years in the field of nuclear radiation, it has been proposed that many chemical reactions can be promoted by such high energy ionizing radiation. However, because the efficiency of reactions so promoted is so low as not to justify the high costs entailed in the use of high energy ionizing radiation, operations using such radiation are not economically feasible on a commercial basis. For example, in chemical reactions induced by high energy ionizing radiation, and particularly in the oxidation of hydrocarbons, the efficiency of the reaction is often so low as to give no appreciable or detectable product formation. Efficient utilization of penetrating gamma radiation is particularly difficult since the reactants absorb only a small fraction of the impinging radiation. Although product formation may often be increased by increasing radiation intensity, because the efficiency, as defined by the product formed per unit of radiation, is independent of or varies inversely with the intensity of the radiation and because often increased intensity causes degradation of the product, raising the intensity of the radiation does not increase efficiency and is often undesirable.

In many chemical reactions, and particularly organic chemical reactions, at the severities under which they are normally carried out, undesirable side products are formed due to the environmental conditions under which the reactions are carried out. For example, in the normal oxidation of hydrocarbons, several products are formed and degradation of the original hydrocarbon skeleton occurs through carbon-to-carbon bond cleavage under normal oxidation temperatures. Accordingly, the major products from the oxidation of propane in the vapor phase are water, hydrogen peroxide, carbon monoxide, formaldehyde and methanol, all of which have fewer carbon atoms than the propane feed. Because of the degradation of the carbon chain of the hydrocarbon during oxidation, such reactions in themselves are not considered commercial routes to alkanols, ketones, and carboxylic acids containing the same carbon skeleton as the feed.

Although oxidation is a reaction which may be promoted by high energy ionizing radiation, I have found that in the promotion of the oxidation reaction at low temperatures so as to avoid carbon-to-carbon chain breakage, high energy ionizing radiation does not efficiently promote the reaction.

I have provided a process for utilizing high energy ionizing radiation, for example gamma radiation, in more efficiently promoting chemical reactions. In accordance with my invention, I have provided a method for producing low energy excited electrons from high-energy ionizing radiation by using an n-type semiconductor solid and for efficiently promoting chemical reactions with the low energy excited electrons thereby produced.

An advantage of this invention is that low energy electrons are provided from high energy ionizing radiation for promoting reactions. Another advantage of the invention herein provided is that it allows greater absorption of high energy ionizing radiation in the reaction system and more efficient use of the radiation in promoting reactions. Still another advantage is that the reactions may be promoted and controlled at less than normal severities and undesirable side reactions may be suppressed. For example, I have provided a process for the oxidation of hydrocarbons at severities less than the normal vapor phase oxidation severities in the presence of high energy ionizing radiation and an n-type semiconductor. By my process oxidation of hydrocarbons is promoted at low temperature and controlled to suppress substantial degradation of the carbon-to-carbon chain and the resulting products are substantially of the same carbon chain configuration as the original hydrocarbon. Thus, this invention provides oxygenated compounds, such as alcohols, carbonyl compounds and hydroperoxides, etc. containing the same number of carbon atoms as the original hydrocarbon as major products and without the necessity of using temperatures as high as the normal vapor phase oxidation temperatures.

More particularly, in accordance with my present invention, a hydrocarbon and oxygen mixture is charged, preferably in the gaseous state, to a reaction zone wherein the hydrocarbon and oxygen reactants are subjected to the influence of low energy excited electrons produced by absorption of high energy ionizing radiation on a solid n-type semiconductor solid. The temperature has little effect on the oxidation reaction, however, the temperature in the reaction zone is preferably maintained below the normal vapor phase oxidation temperature of the hydrocarbon to inhibit the formation of normal vapor phase oxidation products and if the reactants are charged in direct contact with the n-type semiconductor solid the temperature is preferably maintained high enough so that the oxidation reaction is carried out in the vapor phase and products can be removed from the solid by vaporization. All recited temperatures correspond to atmospheric pressure and may be varied at other pressures as known to the art. The partial pressures of the hydrocarbon and oxygen-containing gas are not critical, but for convenience partial pressures between 0.1 and 2 atmospheres are preferred. The hydrocarbons used as a feed to the reaction zone are the saturated and unsaturated aliphatic chain containing hydrocarbons such as the straight chain and branched chain saturated and unsaturated hydrocarbons and the aromatic and cycloparaffinic hydrocarbons having a straight and/or branched, saturated and/or unsaturated chain. The preferred hydrocarbons are those which have more than two carbon atoms and are easily convertible to vapor phase at temperatures within the above-set-out ranges at pressures ranging from normal atmospheric reaction pressures down to 0.1 p.s.i., readily attainable by evacuation. Therefore, the preferred hydrocarbons are those having at least 3 carbon atoms such as, for example, propane, propylene, butane, isobutylene, isobutane, butadiene, pentane, hexane, octane, dodecane, dodecene, hexadecane, heptadecane, eicosane, etc.

The oxygen used is molecular oxygen and may be in the form of substantially 100% oxygen gas or in the form of gaseous mixtures containing lower concentrations of oxygen, e.g., down to about 20%, such as in air. Where the gaseous mixture contains a relatively lower concentration of oxygen, a correspondingly higher pressure or flow rate of the gas should be used, in order that a sufficient amount (or partial pressure) of oxygen is actually fed into the reaction mixture.

The ratio of oxygen fed into the reaction mixture in relation to the hydrocarbon is in the range of 0.1 to 10 or more mols of oxygen per mol of hydrocarbon and preferably in the range of 1 to 3 mols of oxygen per mol of hydrocarbon.

The high energy ionizing radiation may be high energy electromagnetic radiation such as gamma radiation or X-rays or may be corpuscular radiation preferably having a mass number less than 1, i.e. beta particles. The sources of high energy ionizing radiation are well known in the art and include cathode tubes, accelerators such as Van de Graaf machines, accelerator targets and natural and artificial radioactive elements such as, for example, the artificial radioactive element cobalt–60, slab-type indium sulfate irradiators and uranium waste fission products such as, for example, cesium and strontium. High energy ionizing radiation of particular preference for use in the present invention is gamma radiation such as is obtained from cobalt–60 or waste fission products. The radiation intensities in the oxidation reaction should be maintained within the limits of from $10^4$ to $10^{10}$ roentgens per hour for safe operation and preferably from $10^6$ to $10^8$ roentgens per hour. The dosage of radiation absorbed by the feed and solid is from $10^6$ to $10^{12}$ ergs per gram-hour and preferably from $10^8$ to $10^{10}$ ergs per gram-hour. The amount of radiation absorbed will vary within these limits with the overall density of the reactants including the semiconductor solid.

The n-type semiconductors useful in this invention are the solid n-type semiconductors, such as zinc oxide, which are known to the art. The n-type semiconductor solid absorbs high energy radiation and converts it into low energy excited electrons within the solid. The low energy excited electrons then promote the hydrocarbon oxidation reaction on the surface of the solid. The solid, when used admixed with the hydrocarbon reactants, also serves to increase the density of the reactants and thereby increases the radiation absorbed in the reaction system. The n-type semiconductor must be a solid and of a particular nature to be useful in the present case. Upon absorbing radiation, the solid must be able to change the energy into a form which can be utilized by the reactants on the surface of the solid. The electrons in any solid are excited into higher energy levels by radiation but in most cases the excited electrons revert back to the ground state so rapidly that they never reach the solid surface. In the solids useful in the present invention the excited electrons have a long enough lifetime so that they can enter into such surface reactions and do not so rapidly revert to the ground state. The useful solids are found among the salts of the metals in groups II through VIII of the periodic table. The solid is a n-type semiconductor such as zinc sulfide, ferric oxide, cadmium sulfide, titanium oxide, lead oxide, tungsten oxide and, in particular, zinc oxide is preferred. The n-type semi-conductor may contain impurities or other metal salts, for example, zinc oxide containing small amounts of $Al_2O_3$.

The n-type semiconductor solid may be used in either a fixed bed, a moving bed, or a fluidized bed, the efficiency with which the radiation is utilized increasing with the surface to weight ratio of the solid. Although the behavior of the n-type semiconductor solid parallels the behavior of an ordinary heterogeneous catalyst regarding efficiency with increased surface to weight ratio, the behavior does not parallel such catalyst behavior in other respects. The efficiency of an n-type semiconductor solid, i.e. the fraction of the radiation energy absorbed by the solid and transferred to the reactants, depends not only on the surface of the solid but also on its bulk composition. If the surface of the solid is left unchanged and the interior of the solid particle is replaced by an inert material the efficiency of the solid will decrease. The decrease in efficiency is apparently due to absorption of radiation energy by the inert material with no resulting conversion to excited electrons and transfer of that energy to the reactants. In contrast, it is well known that the efficiency of a heterogeneous catalyst may often be increased by depositing the active catalyst on an inert material as a carrier. Another difference between the ordinary oxidation catalyst and the n-type semiconductor solid is that activity in the ordinary catalyst for promotion of the oxidation of hydrocarbons does not indicate activity as an n-type semiconductor solid for promotion of the radiation induced reaction. For example, cupric oxide which is a well known efficient hydrocarbon oxidation catalyst for ordinary oxidation of hydrocarbons is not an efficient promotor of the radiation induced reaction while zinc oxide which is known to be a poor oxidation catalyst is an excellent promotor. In regard to the practicability of a given solid it should be first understood that apparently the bulk electronic structure of the solid is modified in that holes created by excess electrons in the solid are formed in the n-type semiconductor, and the change in electronic structure activates the surface of the solid. A large change in electronic structure upon irradiation is necessary for high efficiency for chemical reactions per unit of surface area.

As pointed out above, the n-type semiconductor does not act in the same manner as an ordinary catalyst and is not to be confused with the ordinary catalysts. However, oxidation catalysts such as organic peroxides, for example, may also be employed in the same reaction to further increase efficiency of the reaction.

In carrying out the present invention, it has been found that the solid becomes poisoned by deposits of water and other oxidation products on the converter surface. Therefore, it is preferred to continually remove such by-products and particularly water from the surface. If a fixed bed of n-type semiconductor solid is used, the water may conveniently be continually removed by flowing the reactants over the bed at a temperature range between 70° and 150° C. to remove the water by evaporation. If a fluidized body of solid is employed, the fluidized solid may be passed through the regeneration zone where the water may be stripped from the solid surface with an air stream at elevated temperature. It has been found that regenerating the n-type semiconductor solid by dehydration increases the efficiency of the solid as much as three times. Dehydration may be effected by heating to from about 100° C. to about 250° C. preferably in a vacuum, for a period of time greater than 5 minutes. A regenerated solid has further been found to be more active than fresh solid and it is therefore advantageous to dehydrate even fresh solid for increased efficiency.

The FIGURE in the drawing illustrates a schematic diagram of an apparatus suitable for carrying out this invention.

In the operation of this process, with reference to the figure, hydrocarbon and oxygen feed is charged through conduit 1 to reaction zone 2. In reaction zone 2, the hydrocarbon and air are subjected to the influence of low energy excited electrons from n-type semiconductor solid 3 held in reaction zone 2 by grid 4 or other suitable means and under the influence of high energy radiation from radiation source 5. The amount of oxidation is primarily controlled by the length of exposure of the reactants to the influence of the excited electrons, short exposure producing alcohols and longer exposure more highly oxidized compounds such as carbonyl compounds and carboxylic compounds. The oxidized hydrocarbons are discharged from reaction zone 2 through conduit 6 for product recovery. The wall 7 of reaction zone 2 between the bed of solid 3 and radiation source 5 is of a material permeable to the high energy radiation from radiation source 5. The apparatus is provided with adequate shield 8 which consists of material substantially impermeable to radiation from radiation source 5 and of sufficient thickness to provide safe operation as is well known in the art. The apparatus is provided with conduit 9 for adding fresh or regenerated solid to the reaction zone and conduit 10 controlled by valve 11 for withdrawing spent solid for regeneration. Conduit 9 is provided with a valve to prevent escape of products. Alternatively the solid may be regenerated in situ by proper adjustment of the temperature of the feed. The rate of flow of the feed is adjusted in accordance with the desired absorbed radiation and the amount of n-type semiconductor solid in the reaction zone.

The temperatures at which the hydrocarbons are oxidized by this invention are not critical but preferably should be maintained below the normal oxidation temperature of the hydrocarbon to minimize side-product formation. For example, temperatures may advantageously be maintained in the range of from about 50° C. to about 150° C. to suppress carbon-to-carbon chain breakage and allow separation of products and water from the solid.

The space velocity at which the hydrocarbon feed is charged to the n-type semiconductor should be in the range of from about 1 to about 100 moles of feed per kilowatt-hour of radiant energy absorbed by the n-type semiconductor and more advantageously from about 10 to about 50 moles of feed per kilowatt-hour absorbed by the n-type semiconductor. For example, when ZnO is used as the n-type semiconductor, the weight space velocity of the hydrocarbon should preferably be from about 10 to about 20 moles of feed per kilowatt-hour absorbed by the ZnO.

As an illustration of oxidation by the present invention, measured amounts of various hydrocarbons were mixed with measured amounts of air or other oxygen containing gas and the resulting reaction mixtures were contacted with a zinc oxide solid and irradiated with X-rays which were generated by a 200 k.v. electron beam impinging upon a tungsten target and were filtered through 0.5 mm. of copper and 1 mm. of aluminum. The intensity of radiation was about $2.6 \times 10^4$ roentgens per hour and the reaction mixtures were each radiated for about 2 hours. Referring to Table I, runs 1 to 4 were in accordance with the present invention. The hydrocarbon oxidized is identified in each run in Table I and the reaction temperature, hydrocarbon partial pressure, air or other oxygen-containing gas partial pressure, radiation dose and amount of conversion of hydrocarbon per kilowatt-hour of absorbed radiation for each run are also set out in Table I. The indicated temperatures were maintained using a surrounding water bath.

The above examples are illustrative of the operation of this invention. Experiments conducted under the same conditions as the examples have been made regarding certain variables in the oxidation reaction. It has been found that the oxidation reaction is not appreciably affected by temperature, hydrocarbon pressure or air pressure. Runs have been made substituting copper, cuprous oxide and mixtures of cuprous and cupric oxides, for the n-type semiconductor solid under the same approximate conditions as the above examples with no measurable reaction occurring. Further, experiments conducted in accordance with the above examples with the exception that either the ionizing radiation or the n-type semiconductor was absent, indicate that both the solid and the radiation are necessary to the hydrocarbon oxidation reaction as indicated by the following data:

| Experiment | Solid | Hydrocarbon | Temp., °C. | Radiation Dose, Roentgens | Conversion of Hydrocarbon per kwh. of Radiation Absorbed |
|---|---|---|---|---|---|
| 1 | None | Isobutane | 73 | $5.4 \times 10^4$ | No reaction detected. |
| 2 | None | Propane | 71-75 | $5.3 \times 10^4$ | Do. |
| 3 | ZnO | ---do--- | 21 | None | Do. |

The zinc oxide solid used in the above examples and experiment was prepared by stirring analytical reagent grade zinc oxide with water and filtering. The filter cake was dried at 95 to 105° C. for 20 hours and then granulated to 10 to 16 mesh. The granulated material was then heated in a nitrogen stream for one hour at 600° C. in order to form n-type semi-conducting zinc oxide.

About thirty-nine percent of the radiation impinging on the sample of each run was scattered from the surrounding water bath and had an effective wave length of 0.216 A. The effective wave length of the primary X-ray beam was 0.135 A. as determined by the required thickness of a copper filter to decrease the radiation intensity by a factor of one-half. The energy absorbed by the zinc oxide solid in the runs was calculated according to the method reported in J. Chem. Phys. 27, 322 (1957). In the calculation of absorbed energy it was assumed that all of the radiation scattered by the zinc oxide was re-adsorbed.

SEMICONDUCTOR REGENERATION

Zinc oxide n-type semiconductor solids were subjected to varying doses of radiation in the oxidation of propane at a temperature of 25 to 26° C., about 240–270 mm. propane partial pressure and about 240 mm. air pressure. The doses of radiation used and the resulting percent conversion of propane and liters of propane conversion per kwh. of radiation absorbed are set out in Table II.

TABLE I

*Oxidation of Hydrocarbons*

| Run No. | Hydrocarbon | Temperature, °C. | Hydrocarbon Pressure, mm. | Air Pressure, mm. | Radiation Dose, Roentgens | Conversion of Hydrocarbon per Kilowatt-Hour of Radiation Absorbed |
|---|---|---|---|---|---|---|
| 1 | Isobutylene | 70-73 | 112 | 131 | $5.3 \times 10^4$ | 22 liters (1.0 mole). |
| 2 | Isobutane | 70-73 | 83 | 167 | $5.3 \times 10^4$ | Do. |
| 3 | Propane | 70-73 | 85 | 241 | $5.3 \times 10^4$ | 19 liters (0.8 mole). |
| 4 | ---do--- | 21 | 269 | 376 | $5.2 \times 10^4$ | 24 liters (1.1 mole). |

TABLE II
Effects of Radiation Dose

| Run. No. | Radiation Dose, Roentgens | Percent Conversion | Conversion, Liters of Propane per kwh. of Radiation Absorbed |
| --- | --- | --- | --- |
| 1 | $1.6 \times 10^4$ | 4.7 | 33 |
| 2 | $2.7 \times 10^4$ | 2.4 | 19 |
| 3 | $3.2 \times 10^4$ | 4.8 | 16 |
| 4 | $5.3 \times 10^4$ | 5.8 | 10 |

Table II demonstrates the decreased activity of the solids with increased radiation dose probably resulting from an accumulation of water on the solid surface. To test dehydrated n-type semiconductors, zinc oxide solids were dehydrated by heating for 30 minutes in a vacuum at 450° C. The solids were then used in propane oxidation under the same conditions as the runs of Table II with improved conversion results as indicated by runs 1 to 3 in Table III. Run 4 of Table III used a zinc oxide solid which had previously become inactive in a propane-oxidation run and was regenerated by dehydrating at 450° C. for 30 minutes in a vacuum.

TABLE III
Effects of Semiconductor Treatment

| Run. No. | Radiation Dose, Roentgens | Percent Conversion | Conversion, Liters of Propane per kwh. of Radiation Absorbed |
| --- | --- | --- | --- |
| 1 | $0.7 \times 10^4$ | 1.5 | 28 |
| 2 | $1.3 \times 10^4$ | 2.0 | 19 |
| 3 | $5.4 \times 10^4$ | 14.1 | 33 |
| 4 | $5.4 \times 10^4$ | 14.2 | 39 |

The hydrocarbon oxidation products were investigated by an inverse isotopic dilution technique. Propane–2C$^{14}$ in admixture with air was irradiated in the presence of dehydrated zinc oxide in a sealed glass ampule using 200 k.v. X-rays. After irradiation, the ampule was broken in the presence of the compound for which the analysis was to be performed. A solid derivative of the compound was prepared and recrystallized to constant specific activity. Knowing the specific activity, the quantity of radioactive oxidation product produced could be calculated. The products of oxidation from two different total doses of radiation ($1.4 \times 10^4$ roentgens and $5.2 \times 10^4$ roentgens) in the presence of an n-type semiconductor solid were analyzed to determine the effect of different total radiation doses on product formation. All runs were carried out at a temperature of about 25° C. The oxidation products were analysed for methanol from the second propane carbon atom, ethanol, n-propanol, isopropanol, acetone, acetaldehyde, propionaldehyde, acetic acid, propionic acid, and carbon dioxide from the second propane carbon atom. At a total dose of $1.4 \times 10^4$ roentgens, it was found that the oxidized product contained isopropanol, n-propanol, acetone, ethanol and carbon dioxide; none of the other products for which analyses were run were detected. At a total dose of $5.2 \times 10^4$ roentgens, the oxidized product also contained these same compounds and no detected amounts of other analyzed constituents. At the higher dose, however, more propane reacted than necessary to form the detected products. Thus, unidentified by-products must have formed at the higher radiation dose. These runs demonstrate that the amount of oxidation of the hydrocarbon and the degree of oxidation of the product may be controlled by the total radiation dose.

What I claim is:

1. A method for the oxidation of hydrocarbons without substantial degradation of the carbon-to-carbon chain which comprises charging an aliphatic hydrocarbon and molecular oxygen to a reaction zone under the influence of a solid n-type semiconductor and subjecting the solid n-type semiconductor to the influence of high energy ionizing radiation at a radiation dosage in the range of $10^6$ to $10^{12}$ ergs per gram-hour and a severity below the normal oxidation severity of said aliphatic hydrocarbon in the presence of said oxygen.

2. The method of claim 1 wherein the n-type semiconductor converter is zinc oxide.

3. The method of claim 1 wherein the high energy ionizing radiation is gamma radiation.

4. The method of claim 1 wherein the oxidation temperature is maintained below the threshold temperature for oxidation in the absence of said influence of the solid n-type semiconductor.

5. The method of claim 1 which includes the additional step of regenerating the n-type semiconductor by dehydration.

6. The method of claim 1 wherein the aliphatic hydrocarbon has at least three carbon atoms in the aliphatic chain.

7. The method of claim 6 wherein the aliphatic hydrocarbon is propane.

8. The method of claim 6 wherein the aliphatic hydrocarbon is isobutylene.

9. The method of claim 6 wherein the aliphatic hydrocarbon is isobutane.

10. A method for the oxidation of hydrocarbons without substantial degradation of the carbon-to-carbon chain which comprises irradiating a solid n-type semiconductor with high energy ionizing radiation at an adsorbed radiation dosage in the range of $10^6$ to $10^{12}$ ergs per gram-hour whereby low energy excited electrons are produced and subjecting an aliphatic hydrocarbon and molecular oxygen to the action of said low energy excited electrons in the zone of influence of said solid n-type semiconductor at a severity below the normal oxidation severity of said aliphatic hydrocarbon in the presence of said oxygen and said high energy ionizing radiation.

11. A method for the oxidation of hydrocarbons without substantial degradation of the carbon-to-carbon chain which comprises charging an aliphatic hydrocarbon and molecular oxygen to a reaction zone containing a solid n-type semiconductor, said n-type semiconductor being normally deficient as an oxidation catalyst, subjecting said reaction zone to the influence of high energy ionizing radiation at an absorbed radiation dosage of from $10^6$ to $10^{12}$ ergs per gram-hour and at a temperature below the threshold temperature for oxidation of said aliphatic hydrocarbon in the absence of said solid n-type semiconductor and removing oxygenated said aliphatic hydrocarbon from the reaction zone, said n-type semiconductor being unchanged in chemically bonded oxygen content.

12. In a process for the oxidation of an aliphatic hydrocarbon with molecular oxygen, the improved method of oxidizing said aliphatic hydrocarbon to an oxygenated aliphatic hydrocarbon having substantially the same carbon chain configuration as said aliphatic hydrocarbon, which improved method comprises subjecting the aliphatic hydrocarbon and molecular oxygen to the influence of low energy excited electrons from an n-type semiconductor under the influence of high energy ionizing radiation at a radiation dosage of from $10^6$ to $10^{12}$ ergs per gram-hour and at a temperature below the threshold temperature for oxidation of said aliphatic hydrocarbon in the absence of said low energy electrons.

13. A method for the oxidation of an aliphatic hydrocarbon having at least 3 carbon atoms without substantial degradation of the carbon-to-carbon chain of said aliphatic hydrocarbon, which method comprises reacting said aliphatic hydrocarbon with from about 0.1 to about 10 mols of molecular oxygen per mol of said aliphatic hydrocarbon at a temperature below the carbon-to-carbon degradation temperature in a reaction zone under the influence of solid zinc oxide irradiated with high energy ionizing radiation at a radiation dosage in the range of from $10^6$ to $10^{12}$ ergs per gram-hour.

14. A method for the oxidation of an aliphatic hydrocarbon having at least 3 carbon atoms to form an oxygenated hydrocarbon having substantially the same carbon chain configuration as said aliphatic hydrocarbon, which method comprises reacting said aliphatic hydrocarbon in the gaseous phase with from about 1 to about 3 mols of molecular oxygen per mol of said aliphatic hydrocarbon at a temperature below about 150° C. in the presence of low energy excited electrons emitted from solid zinc oxide under the influence of high energy ionizing radiation.

15. A process for producing an oxygenated aliphatic hydrocarbon from molecular oxygen and an aliphatic hydrocarbon having substantially the same carbon chain configuration as said oxygenated hydrocarbon, which process comprises irradiating solid zinc oxide with high energy ionizing radiation at a radiation dosage in the range of $10^6$ to $10^{12}$ ergs per gram-hour whereby low energy excited electrons are produced, charging said aliphatic hydrocarbon at a space velocity of from about 1 to about 100 moles per kilowatt-hour of radiant energy absorbed by the zinc oxide to a reaction zone under the influence of said excited electrons and in the presence of from about 0.1 to about 10 mols of molecular oxygen per mol of said aliphatic hydrocarbon at a temperature below the normal oxidation temperature of said aliphatic hydrocarbon in the presence of said molecular oxygen, and recovering said oxygenated aliphatic hydrocarbon as a product having substantially the same carbon skeleton as said aliphatic hydrocarbon.

References Cited in the file of this patent

UNITED STATES PATENTS

| | | |
|---|---|---|
| 2,743,223 | McClinton et al. | Apr. 24, 1956 |
| 2,934,481 | Ruskin | Apr. 26, 1960 |

FOREIGN PATENTS

| | | |
|---|---|---|
| 1,148,720 | France | June 24, 1957 |

OTHER REFERENCES

Taylor et al.: J.A.C.S., vol. 79, pages 252, 253, January 1957.

Liebenthal, Chemical Effects of Radiation, volume 29, 1958, pages 107–111.